United States Patent
Runnebohm

(10) Patent No.: US 10,405,537 B2
(45) Date of Patent: Sep. 10, 2019

(54) DECOY RETRIEVAL SYSTEM

(71) Applicant: Christopher Runnebohm, St. Paul, IN (US)

(72) Inventor: Christopher Runnebohm, St. Paul, IN (US)

( * ) Notice: Subject to any disclaimer, the term of this patent is extended or adjusted under 35 U.S.C. 154(b) by 163 days.

(21) Appl. No.: 15/611,044

(22) Filed: Jun. 1, 2017

(65) Prior Publication Data

US 2018/0343851 A1 Dec. 6, 2018

(51) Int. Cl.
*A01M 31/06* (2006.01)
*A01M 99/00* (2006.01)

(52) U.S. Cl.
CPC ............ *A01M 31/06* (2013.01); *A01M 99/00* (2013.01)

(58) Field of Classification Search
CPC .................................................... A01M 31/06
USPC .......................................................... 43/2, 3
See application file for complete search history.

(56) References Cited

U.S. PATENT DOCUMENTS

| | | | |
|---|---|---|---|
| 2,444,597 A | 7/1948 | Erickson | |
| 2,471,231 A | 5/1949 | Miller | |
| 2,522,692 A * | 9/1950 | Speer | A01K 97/14 294/66.1 |
| 3,898,755 A | 8/1975 | Halvorson | |
| 5,826,928 A | 10/1998 | Shang | |
| 5,893,230 A * | 4/1999 | Koltoniak | A01M 31/06 43/3 |
| 6,986,537 B2 | 1/2006 | Robbins et al. | |
| D698,413 S | 1/2014 | Bennis | |
| 2004/0025770 A1 * | 2/2004 | Saunoris | A01M 31/00 114/144 A |
| 2005/0178043 A1 * | 8/2005 | Markley | A01M 31/00 43/26.1 |
| 2014/0353992 A1 | 12/2014 | VanCamp | |
| 2016/0295853 A1 * | 10/2016 | Evenson | A01M 31/06 |

* cited by examiner

*Primary Examiner* — Christopher P Ellis

(57) ABSTRACT

A decoy retrieval system includes a decoy that is selectively thrown into a body of water thereby facilitating the decoy to float on the water. A retrieval unit is provided and the retrieval unit is selectively thrown into the body of water. The retrieval unit is comprised of a buoyant material to float on the water. Moreover, the retrieval unit is coupled to a retrieval line to be drawn out of the water. The retrieval unit has a plurality of hooks thereon to selectively engage the decoy. In this way the decoy may be retrieved from the water without requiring a user to enter the water.

4 Claims, 3 Drawing Sheets

DECOY RETRIEVAL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to retrieval devices and more particularly pertains to a new retrieval device for retrieving waterfowl decoys from water.

BRIEF SUMMARY OF THE INVENTION

An embodiment of the disclosure meets the needs presented above by generally comprising a decoy that is selectively thrown into a body of water thereby facilitating the decoy to float on the water. A retrieval unit is provided and the retrieval unit is selectively thrown into the body of water. The retrieval unit is comprised of a buoyant material to float on the water. Moreover, the retrieval unit is coupled to a retrieval line to be drawn out of the water. The retrieval unit has a plurality of hooks thereon to selectively engage the decoy. In this way the decoy may be retrieved from the water without requiring a user to enter the water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
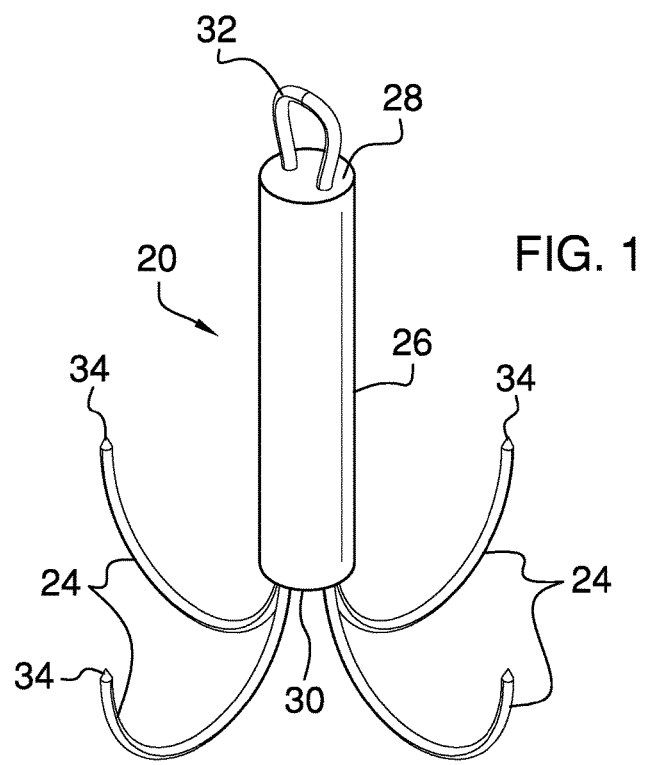
FIG. 1 is a top perspective view of a retrieval unit of a decoy retrieval system according to an embodiment of the disclosure.
Figure 2:
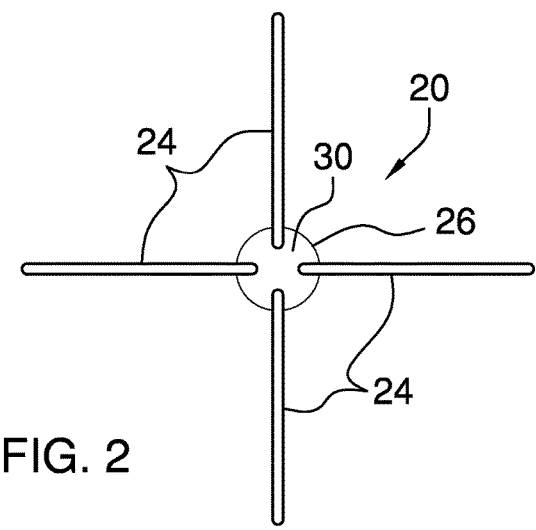
FIG. 2 is a bottom view of a retrieval unit of an embodiment of the disclosure.
Figure 3:
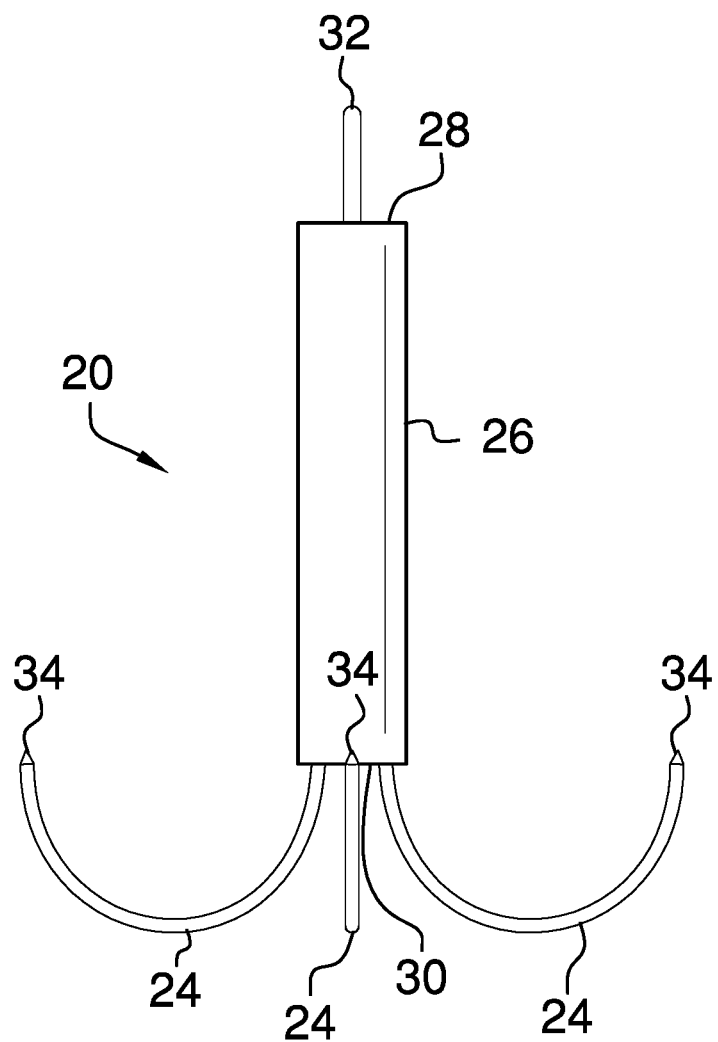
FIG. 3 is a front view of a retrieval unit of an embodiment of the disclosure.
Figure 4:
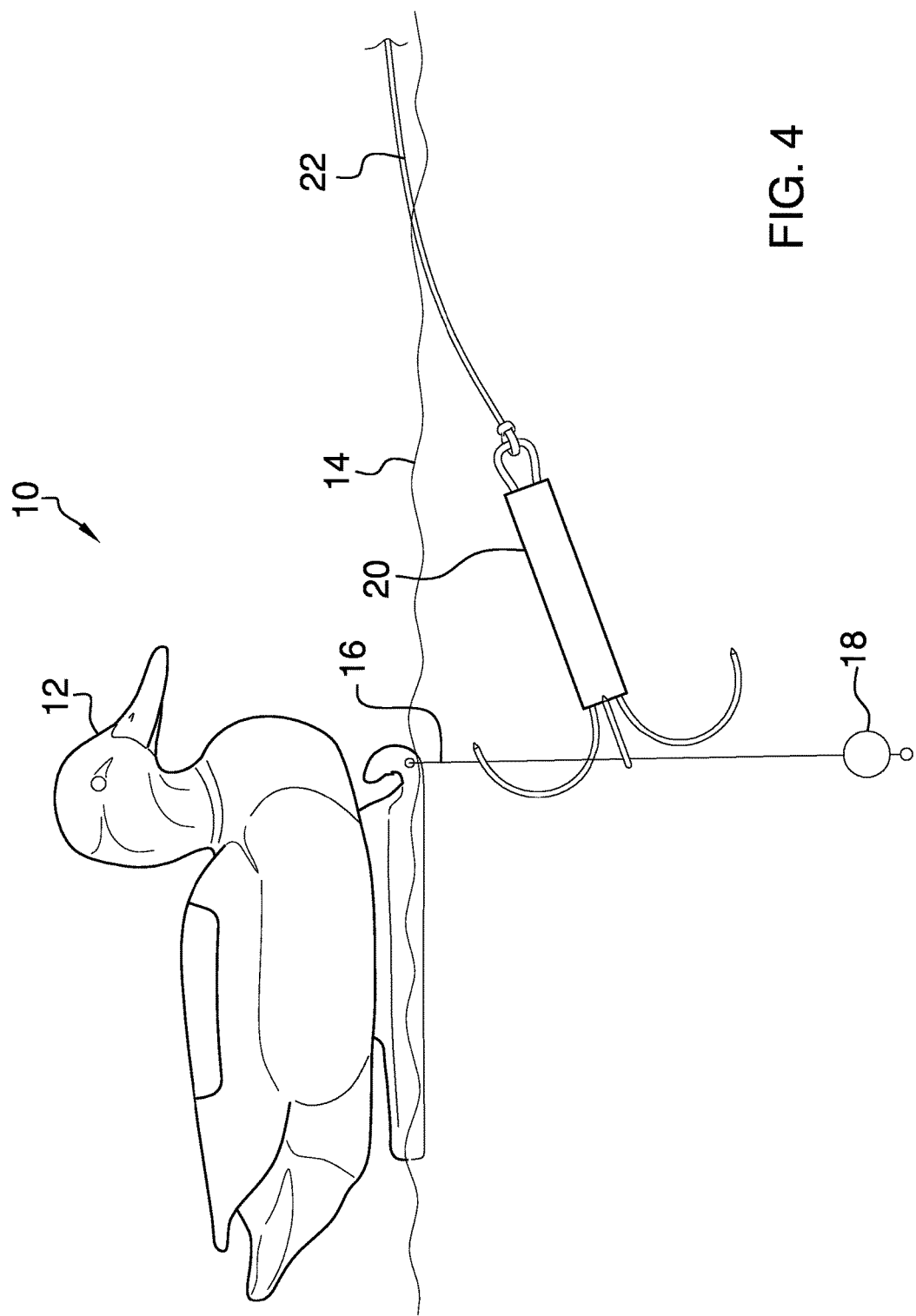
FIG. 4 is a perspective in-use view of an embodiment of the disclosure.

With reference now to the drawings, and in particular to FIGS. 1 through 4 thereof, a new retrieval device embodying the principles and concepts of an embodiment of the disclosure and generally designated by the reference numeral 10 will be described.

As best illustrated in FIGS. 1 through 4, the decoy retrieval system 10 generally comprises a decoy 12 that is selectively thrown into a body of water 14 thereby facilitating the decoy 12 to float on the water 14. A line 16 is coupled to the decoy 12 and a weight 18 is coupled to the line 16. The weight 18 inhibits the decoy 12 from moving when the decoy 12 is thrown into the water 14. Additionally, the decoy 12 may be a waterfowl decoy of any conventional design, to include, but not be limited to, duck decoys and goose decoys. In this way the decoy 12 may attract waterfowl to the body of water 14 for the purposes of hunting.

A retrieval unit 20 is provided and the retrieval unit 20 is selectively thrown into the body of water 14. The retrieval unit 20 is comprised of a buoyant material such that the retrieval unit 20 floats on the water 14. The retrieval unit 20 is coupled to a retrieval line 22 to facilitate the retrieval unit 20 to be drawn out of the water 14. The retrieval line 22 may be a line of a fishing pole, a rope and any other line to draw the retrieval unit 20 from the water 14. The retrieval unit 20 has a plurality of hooks 24 thereon to selectively engage the decoy 12. In this way the decoy 12 is retrieved from the water 14 without requiring a user to enter the water 14 thereby facilitating the user to hunt waterfowl without a dog and a boat.

The retrieval unit 20 comprises a float 26 that is comprised of a buoyant material to float on the water 14. The float 26 has a first end 28 and a second end 30 and a fastener 32 that is coupled to the first end 28. The retrieval line 22 is selectively coupled to the fastener 32 and the fastener 32 may comprise a closed loop. The float 26 may be elongated between the first 28 and second 30 ends and the float 26 may have a length ranging between approximately 10.0 cm and 15.0 cm.

Each of the hooks 24 is coupled to the second end 30 and each of the hooks 24 has a distal end 34 with respect to the second end 30. Moreover, the hooks 24 are spaced apart from each other and are distributed around the float 26. Each of the hooks 24 is curved between the second end 30 and the distal end 34. Thus, the distal end 34 of each of the hooks 24 is directed toward the first end 28 of the float 26 and the distal end 34 of each of the hooks 24 is spaced from the float 26. A selected one of the hooks 24 engages the decoy 12 and the line when the retrieval unit 20 is thrown into the water 14 and retrieved.

In use, the decoy 12 is thrown into the body of water 14 for the purposes of hunting. Additionally, a plurality of decoys 12 is selectively thrown in the water 14 and each of the plurality of decoys 12 is spaced a wide distance apart from each other to simulate a flock of waterfowl on the water 14. The retrieval unit 20 is selectively thrown into the water 14 to retrieve a waterfowl that has been shot during hunting. In this way the waterfowl is retrieved from the water 14 without having a dog for retrieving the waterfowl, without using a boat and without requiring the user to enter the water 14. Additionally, the retrieval unit 20 is thrown at each of the decoys 12 to selectively retrieve the decoys 12. In this way each of the decoys 12 is retrieved without using a boat and without requiring the user to enter the water 14.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A decoy retrieval system comprising:
   a decoy being configured to be thrown into a body of water thereby facilitating said decoy to float on the water, said decoy including a line and a weight; and
   a retrieval unit being configured to be selectively thrown into the body of water, said retrieval unit being comprised of a buoyant material wherein said retrieval unit is configured to float on the water, said retrieval unit being coupled to a retrieval line wherein said retrieval unit is configured to be drawn out of the water, said retrieval unit having a plurality of hooks thereon to selectively engage said decoy thereby facilitating the decoy to be retrieved from the water without requiring a user to enter the water, said retrieval unit comprising
   a float being comprised of a buoyant material wherein said float is configured to float on the water, said float having a first end and a second end, each of said hooks being coupled to and extending directly from said second end of said float wherein said float is configured to support said hooks on the water.

2. The system according to claim 1, further comprising a fastener being coupled to said first end, said retrieval line being selectively coupled to said fastener.

3. The system according to claim 1, further comprising each of said hooks having a distal end with respect to said second end, each of said hooks being curved between said second end and said distal end such that said distal end of each of said hooks is directed toward said first end of said float having said distal end of each of said hooks being spaced from said float, a selected one of said hooks engaging said decoy and said line when said retrieval unit is thrown into the water and retrieved.

4. A decoy retrieval system comprising:
   a decoy being configured to be thrown into a body of water thereby facilitating said decoy to float on the water, said decoy including a line and a weight; and
   a retrieval unit being configured to be selectively thrown into the body of water, said retrieval unit being comprised of a buoyant material wherein said retrieval unit is configured to float on the water, said retrieval unit being coupled to a retrieval line wherein said retrieval unit is configured to be drawn out of the water, said retrieval unit having a plurality of hooks thereon to selectively engage said decoy thereby facilitating the decoy to be retrieved from the water without requiring a user to enter the water, said retrieval unit comprising:
      a float being comprised of a buoyant material wherein said float is configured to float on the water, said float having a first end and a second end,
      a fastener being coupled to said first end, said retrieval line being selectively coupled to said fastener, and
      each of said hooks being coupled to and extending directly from said second end of said float wherein said float is configured to support said hooks on the water, each of said hooks having a distal end with respect to said second end, each of said hooks being curved between said second end and said distal end such that said distal end of each of said hooks is directed toward said first end of said float having said distal end of each of said hooks being spaced from said float, a selected one of said hooks engaging said decoy and said line when said retrieval unit is thrown into the water and retrieved.

* * * * *